(12) United States Patent
Sinor

(10) Patent No.: US 9,965,645 B2
(45) Date of Patent: May 8, 2018

(54) FIELD LEVEL DATA PROTECTION FOR CLOUD SERVICES USING ASYMMETRIC CRYPTOGRAPHY

(71) Applicant: NETSUITE INC., San Mateo, CA (US)

(72) Inventor: Dale Sinor, Aptos, CA (US)

(73) Assignee: NETSUITE Inc., San Mateo, CA (US)

(*) Notice: Subject to any disclaimer, the term of this patent is extended or adjusted under 35 U.S.C. 154(b) by 0 days. days.

(21) Appl. No.: 15/153,439

(22) Filed: May 12, 2016

(65) Prior Publication Data

US 2016/0335451 A1 Nov. 17, 2016

Related U.S. Application Data

(63) Continuation of application No. 14/480,323, filed on Sep. 8, 2014, now Pat. No. 9,369,443.

(60) Provisional application No. 61/879,428, filed on Sep. 18, 2013.

(51) Int. Cl.
  *G06F 21/62* (2013.01)
  *H04L 29/06* (2006.01)

(52) U.S. Cl.
  CPC ........ *G06F 21/6227* (2013.01); *H04L 63/045* (2013.01); *H04L 63/0442* (2013.01); *H04L 63/06* (2013.01); *H04L 63/08* (2013.01); *H04L 63/102* (2013.01); *H04L 67/42* (2013.01)

(58) Field of Classification Search
  CPC ... H04L 63/08; H04L 63/045; H04L 63/0442; H04L 63/102; H04L 63/06; H04L 67/42; G06F 21/6227
  See application file for complete search history.

(56) References Cited

U.S. PATENT DOCUMENTS

| 6,978,367 B1* | 12/2005 | Hind ................ G06F 21/577 380/273 |
| 7,484,107 B2* | 1/2009 | Forlenza ............. H04L 9/088 380/260 |
| 8,522,027 B2 | 8/2013 | Canard et al. |
| 2002/0078346 A1 | 6/2002 | Sandhu et al. |
| 2005/0195975 A1 | 9/2005 | Kawakita |
| 2009/0161869 A1 | 6/2009 | Chow et al. |
| 2011/0107102 A1 | 5/2011 | Canard et al. |
| 2012/0109830 A1 | 5/2012 | Vogel |
| 2014/0325225 A1 | 10/2014 | Liu et al. |

* cited by examiner

*Primary Examiner* — Beemnet Dada
(74) *Attorney, Agent, or Firm* — Cooper Legal Group, LLC

(57) ABSTRACT

Systems, apparatuses, and methods for providing data security for data that is stored in a cloud-level platform. In one embodiment, each session is associated with specific session "keys" for use in encrypting and decrypting data. The session specific keys are generated by a client application and the client public key of a public/private key pair is provided to the cloud platform as part of a user authentication process. If the user is properly authenticated, then the platform creates its own set of keys and sends the server public key of a public/private key pair to the client. When the client requests a data record or document, the platform can determine if the user is authorized to have access to the entire data record or document or only to certain fields or portions of the record or document. Based on that determination, the platform may selectively encrypt certain fields or portions of the record or document with the client public key.

25 Claims, 7 Drawing Sheets

FIELD LEVEL DATA PROTECTION FOR CLOUD SERVICES USING ASYMMETRIC CRYPTOGRAPHY

CROSS REFERENCE TO RELATED APPLICATION

This application is a continuation of U.S. patent application Ser. No. 14/480,323, entitled "Field Level Data Protection for Cloud Services Using Asymmetric Cryptography," filed Sep. 8, 2014, which claims the benefit of U.S. Provisional Application No. 61/879,428, entitled "Field Level Data Protection for Cloud Services Using Asymmetric Cryptography," filed Sep. 18, 2013, which are incorporated herein by reference in their entirety (including the Appendix) for all purposes.

BACKGROUND

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify the required business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system can include: accounting, order processing, time and billing, inventory management, employee management/payroll, human resources management, and employee calendaring and collaboration, as well as reporting and analysis capabilities relating to these functions.

In a related movement, substantial efforts have also been directed to integrated Customer Relationship Management (CRM) systems, with a view toward obtaining a better understanding of customers, enhancing service to existing customers, and acquiring new, profitable customers. By way of example, the capabilities or modules of a CRM system can include: sales force automation (SFA), marketing automation, contact list, call center support, and web-based customer support, as well as reporting and analysis capabilities relating to these functions. With differing levels of overlap with ERP/CRM initiatives and with each other, substantial efforts have also been directed toward development of increasingly integrated partner and vendor management systems, web store/eCommerce systems, product lifecycle management (PLM) systems, and supply chain management (SCM) systems.

Such business systems and applications often perform functions that involve the storage, access, and processing of confidential or proprietary data, information, or documents. Such data may include non-public revenue projections, sales data, product roadmaps, long range planning documents, etc. The confidential data may also include information about financial transactions or employees that is expected to remain private, such as medical or other personal information. The release or other use of such information may be controlled by specific policies, regulations, agreements, or laws. For example, the use of certain types of private medical data (e.g., Protected Health Information, PHI) may be governed by one or more Federal laws, such as HIPAA (the Health Insurance Portability and Accountability Act). HIPAA (and its associated regulations) imposes certain security requirements on personal medical data that is provided to third parties, such as requiring that it be encrypted and/or otherwise protected when being transmitted to another party. Similarly, data regarding certain types of financial transactions may be required to be (or at least is desired to be) encrypted when provided to another party over a communications network.

The requirement that certain data be encrypted prior to transmission to another party introduces a potential problem for users of cloud-based data processing platforms and systems. Such platforms/systems typically store each tenant's data in one or more data storage elements, such as a database. The data contained within the database may be encrypted in accordance with an encryption process that is specific to the database and its data management system. Databases typically use AES and symmetric key encryption algorithms. Database decryption generally happens at the point the data is read from the storage device but it is technically possible to transmit the encrypted data (as it exists on the storage device) and have the receiver of the transmission decrypt it. In most cases, when a remote user desires to access data contained in the database, the data is typically decrypted in accordance with the data(base) management system and prepared for transmission to the user over a communications network (e.g., the Internet).

The decrypted data may then be (re)encrypted using a different process prior to such transmission, based on one or more security protocols (e.g., using HTTPS and SSL (secure socket layer), or another type of data security protocol). For example, SSL may use X.509 certificates and hence a form of asymmetric cryptography to authenticate the counterparty with whom they are communicating, and to exchange a symmetric key. This session key is then used to encrypt data flowing between the parties. When using such a security protocol, the encryption and decryption processes are applied to entire records or documents. This means that after transmission over the communications network, the recipient will have access to the entire record or document.

This type of data protection process can create a problem if the data or some of the data contained in a record or document is supposed to (or required to) remain confidential or protected (such as data protected under the terms of HIPAA). This is because the end user may be given access to confidential data that is contained in a document or data record that they are not entitled to have access to, and therefore should not be able to see. Further, in some cases an end user may have authorization to view and alter certain protected data, and in such situations they need to have a way to alter the data, save it, and then transfer it back securely to a server or database for storage.

Conventional approaches to providing data security enable protection of entire documents or sets of data, but do not provide an effective means of preventing unauthorized access to specific sections of documents or fields of data. Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to systems, apparatuses, and methods for providing data security for data that is stored in a cloud-level platform and is provided to a user operating a remote client device. In one embodiment, each session is associated with specific session "keys" for use in encrypting and decrypting data. The session specific keys are generated by a client application and the client public key of a public/private key pair is provided to the cloud platform as part of a user authentication process. If the user is properly authenticated, then the platform creates its own set of keys and sends the server public key of a public/private key pair to the client. In another embodiment, the client public keys may be previously stored on the platform and may be unique for each authorized user or shared by users with authorization to the same protected fields.

When the client requests a data record or document, the platform can determine if the user is authorized to have access to the entire data record or document, or if they are not authorized to access certain fields or portions of the record or document. Based on that determination, the platform may selectively encrypt certain fields or portions of the record or document with the client public key (so that those portions can be decrypted by the client and displayed to the user), while encrypting other fields or portions of the record or document with a different data protection method, so that the data contained in those fields or portions are not accessible by the client, and thus remain protected and confidential. If the user is authorized to have access to certain confidential data, then they may be permitted to edit the confidential data and then have the fields containing that data encrypted using the platform public key prior to transmission to the platform (thereby enabling the platform to decrypt those fields and properly store the data in the appropriate data storage element, such as a database).

One or more embodiments of the invention may utilize a form of "asymmetric cryptography", which refers to a cryptographic algorithm which requires two separate keys for encrypting and decrypting. Such algorithms or methods include, but are not limited to RSA, DH (Diffie-Hellman), or other asymmetric cryptography methods or processes currently known or yet to be created.

In one embodiment, the invention is directed to a method improving the performance of a computing platform, where the method includes:

receiving a first electronic communication from a remote computing device requesting access to a data record having a plurality of elements stored in a data storage element of the platform, the first electronic communication including authentication data corresponding to a user of the remote computing device;

analyzing the authentication data to determine that the user is authorized to access some but not all of the plurality of elements of the data record;

generating a second electronic communication to the remote computing device that includes an encrypted version of the requested data record, wherein the encrypted version includes a first set of elements of the plurality of elements that are encrypted such that the remote computing device is configured to decrypt the first set of elements and a second set of elements of the plurality of elements that are encrypted such that the remote computing device cannot decrypt the second set of elements.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
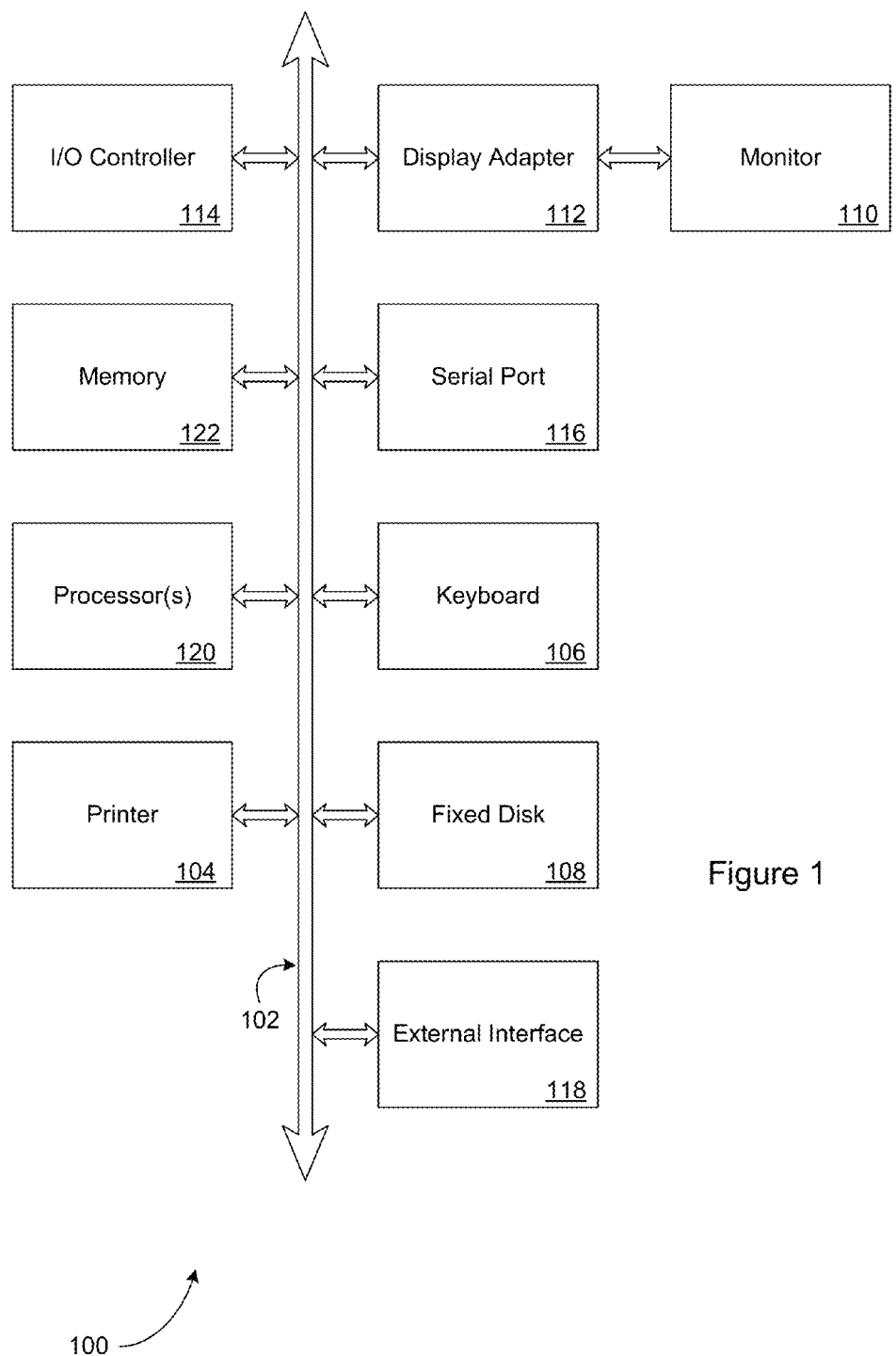
FIG. 1 is a diagram illustrating elements or components that may be present in a computer device and/or system configured to implement a method and/or process in accordance with an embodiment of the invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc. that is part of a client device, server, network element, or other form of computing device) that are programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the present invention are directed to systems, apparatuses, and methods for providing data security for data that is stored in a cloud-level platform and is provided to a user operating a remote client device. In one embodiment, each session is associated with specific session "keys" for use in encrypting and decrypting data. The session specific keys are generated by a client application and the client public key of a public/private key pair is provided to the cloud platform as part of a user authentication process. If the user is properly authenticated, then the platform creates its own set of keys and sends the server public key of a public/private key pair to the client. When the client requests a data record or document, the platform can determine if the user is authorized to have access to the entire data record or document, or if they are not authorized to access certain fields or portions of the record or document. Based on that determination, the platform may selectively encrypt certain fields or portions of the record or document with the client public key (so that those portions can be decrypted by the client and displayed to the user), while encrypting other fields or portions of the record or document with a different data protection method, so that the data contained in those fields or portions are not accessible by the client, and thus remain protected and confidential. If the user is authorized to have access to certain confidential data, then they may be permitted to edit the confidential data and then have the fields containing that data encrypted using the platform public key prior to transmission to the platform (thereby enabling the platform to decrypt those fields and properly store the data in the appropriate data storage element, such as a database). In another embodiment, the client public keys may be previously stored on the platform and may be unique for each authorized user or shared by users with authorization to the same protected fields.

One or more embodiments of the invention may utilize a form of "asymmetric cryptography", which refers to a cryptographic algorithm which requires two separate keys for encrypting and decrypting. Such algorithms or methods include, but are not limited to RSA, DH (Diffie-Hellman), or other asymmetric cryptography methods or processes currently known or yet to be created.

In some embodiments, the invention may be implemented in the context of a multi-tenant, "cloud" based environment, typically used to develop and provide web services for end users. This exemplary implementation environment will be described with reference to FIGS. 2 and 3. Note that embodiments of the invention may also be implemented in the context of other computing or operational environments or systems, such as for an individual business data processing system, a remote or on-site data processing system, other form of client-server architecture, other form of remote data storage, etc. In some embodiments, the inventive systems, apparatuses, and processes may be used to enable retrieval of data from a data storage element or database in a situation where certain portions or fields of the retrieved data contain confidential or proprietary information that some of those accessing the data are not authorized to view.

Figure 2:
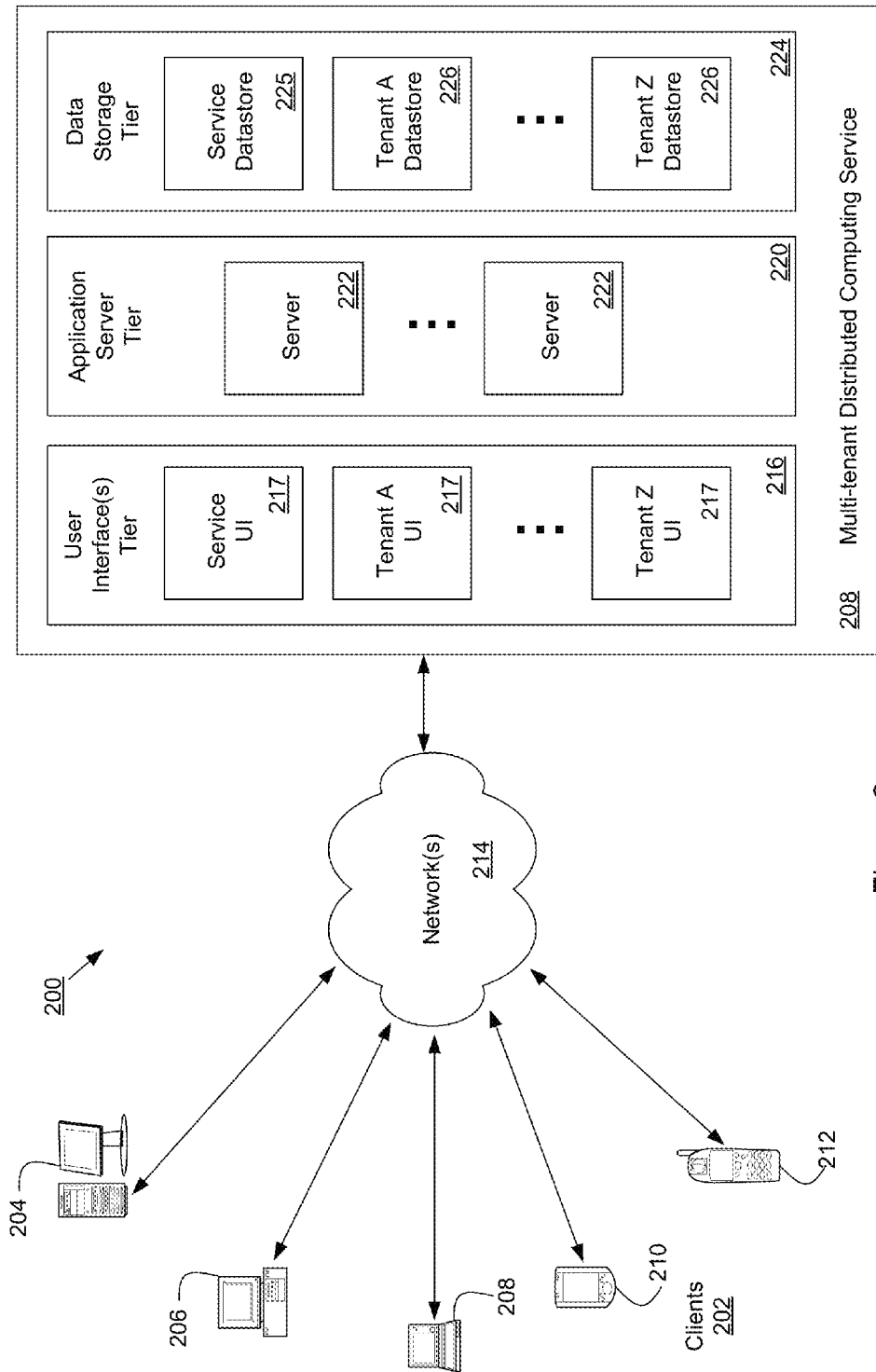
FIG. 2 is a diagram illustrating elements or components of an example operating environment in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 208, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and wireless communication technologies and networks operating in accordance with any suitable networking and/or communication protocol (e.g., the Internet).

The distributed computing service/platform 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI"), as well as one or more user interfaces that have been specialized in accordance with user specific requirements (e.g., represented by "Tenant A UI", . . . , "Tenant Z UI", and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific services or functions, including but not limited to ERP, CRM, eCommerce, Human Resources management, medical/dental insurance administration, payroll, etc. As noted, some or all of this data may be confidential and/or proprietary and therefore subject to one or more policies, regulations, or laws regarding its uses and transfer. Data stores may be implemented with any suitable data storage technology, including structured query language (SQL) based relational database management systems (RDBMS).

In accordance with at least one embodiment of the invention, distributed computing service/platform 208 may be multi-tenant and service platform 208 may be operated by an entity in order to provide multiple tenants with a set of business related applications and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include: accounting, order processing, time and billing, inventory management, employee management/payroll, and employee calendaring and collaboration, as well as reporting and analysis capabilities relating to these functions. Another business information system that may be provided as part of a service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system may include: sales force automation (SFA), marketing automation, contact list management, call center support, and web-based customer support, as well as reporting and analysis capabilities relating to these functions. In addition to ERP and CRM functions, a business information system (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform. As a further example, a set of Human Resource (HR) Management related functions or processes can be provided by one or more applications installed on the services platform. These HR functions or processes may include payroll or administration of medical/dental insurance or stock plans, and may involve use and transmission of personal employee information (such as social security numbers, private medical data, stock grants, etc.).

The integrated business system shown in FIG. 2 may be hosted on a distributed computing system made up of at least one, but likely multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers, and the software applications running on the remote computers, being served as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

Rather than build such an integrated business system themselves, a business may utilize systems provided by a third party. Such a third party may implement an integrated business system as described above in the context of a multi-tenant platform, wherein individual instantiations of a single comprehensive integrated business system are provided to a variety of tenants. A key advantage to such multi-tenant platforms is the ability for each tenant to customize their instantiation of the integrated business system to that tenant's specific business needs. This may include implementing extensions to the functionality of existing functional application modules or introducing new functional capabilities in the form of added application modules. For example, one extension or new functionality may be an embodiment of the inventive data security process described herein.

Figure 3:
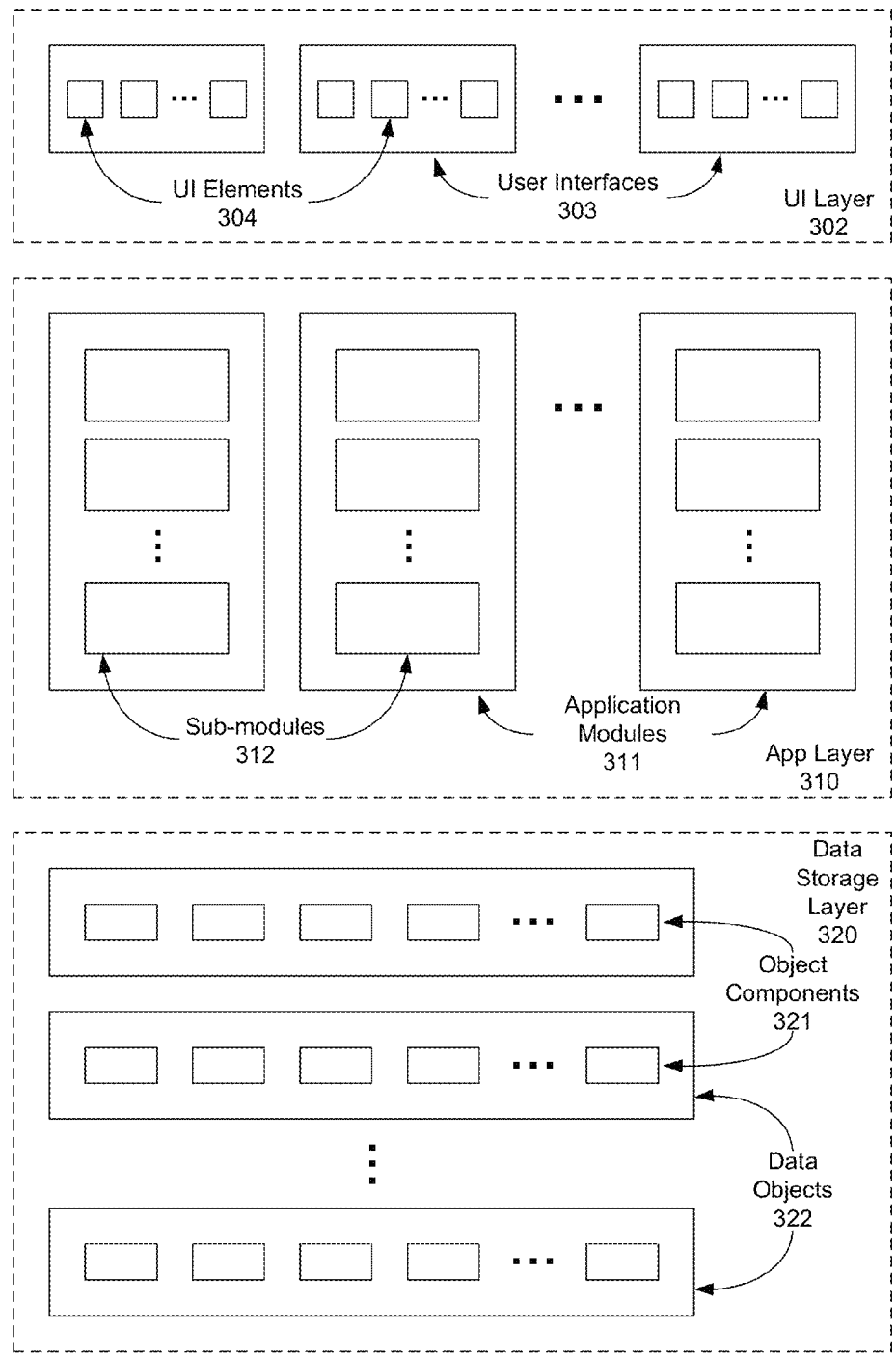
FIG. 3 is a diagram illustrating additional details of the elements or components of the distributed data processing/computing service platform of FIG. 2, in which an embodiment of the invention may be implemented.

FIG. 3 is a diagram illustrating additional details of the elements or components of the distributed data processing/computing service platform of FIG. 2, in which an embodiment of the invention may be implemented. The software architecture depicted in FIG. 3 represents an example of a complex data processing system to which an embodiment of the invention may be applied. In general, an embodiment of the invention may be implemented as a set of software instructions that are designed to be executed by a suitably programmed processing element (such as a CPU, microprocessor, processor, controller, computing device, etc.) and are used to control the access by users to data, information, or documents stored in a data storage element of a data processing system.

In such embodiments, a portion or portions of the data or information stored in a field, record, or document (for example) may be restricted to being viewed by a subset of the users who can access the field, record, or document. This may occur, for example, because the data contained in that portion of a field, record, or document is personal, confidential, or proprietary and is subject to restrictions or controls. In such cases, an embodiment of the invention permits control over the access, viewing, and editing of the protected portion or portions of the field, record, or document, while permitting other users to access the remaining portion or portions. Note that in a complex system such instructions are typically arranged into "modules" with each such module performing a specific task, process, function, or operation. The entire set of modules may be controlled or coordinated in their operation by an operating system (OS) or other form of organizational platform.

FIG. 3 illustrates elements of an example of a distributed data processing/computing service architecture 300 and represents an environment in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 310 may include one or more application modules 311, each having one or more sub-modules 312. Each application module 311 or sub-module 312 may correspond to a particular function, method, process, or operation that is implemented by the module or sub-module. Such function, method, process, or operation may include those used to implement one or more aspects of the inventive system and methods (such as the inventive data security and access control process), one or more eCommerce platform functions, the accessing of ERP, CRM, eCommerce, or other data upon receiving a request for the data from a client, the execution of specified data processing operations, etc.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example data processing/computing environments depicted in FIGS. 2-3 are not intended to be limiting examples. Alternatively, or in addition, computing environments in which an embodiment of the invention may be implemented include any suitable system that permits users to access and utilize data stored in a data storage element (e.g., a memory or database) that can be accessed remotely over a network. Although further examples below may reference the example computing environment depicted in FIGS. 2-3, it will be apparent to one of skill in the art that the examples may be adapted for alternate data processing/computing devices, systems, and environments.

Figure 4:
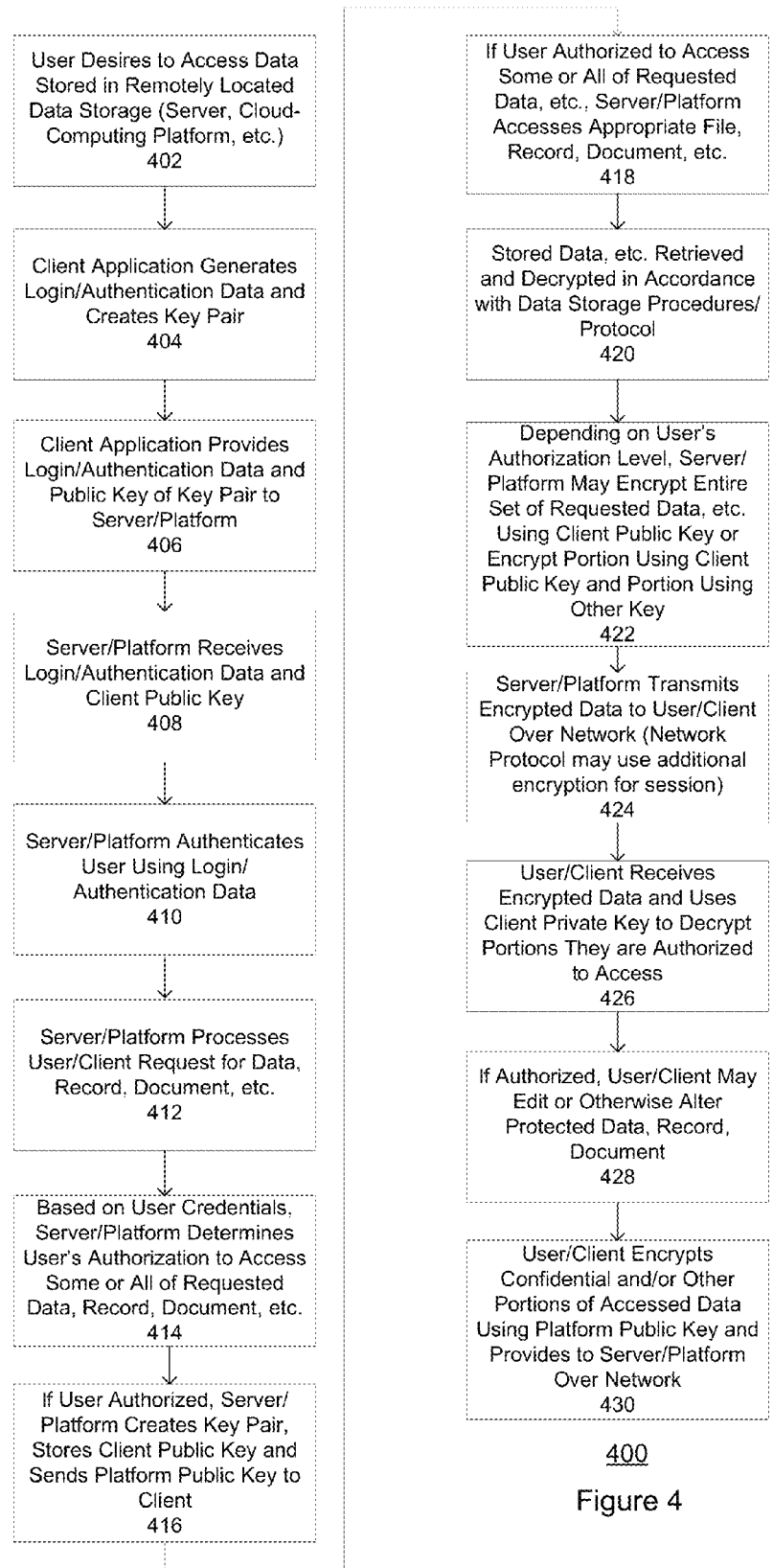
FIG. 4 is a flow chart or flow diagram illustrating a process, method, operation, or function for providing field level protection of data that may be used when implementing an embodiment of the invention.

FIG. 4 is a flow chart or flow diagram illustrating a process, method, operation, or function 400 for providing field level protection of data that may be used when implementing an embodiment of the invention. As shown in the figure, in one embodiment, a user may desire to access data stored in a remotely located data storage element (such as a database or data storage element associated with a server, computing device, cloud-computing platform, web service, etc.), as represented by step or stage 402. The desired data may be in the form of a document, database entry, data table, data record, or other suitable form. The data may be stored in a database, data storage element, or other suitable component. A user request for the data is typically generated by a client application (such as a browser) that identifies the requested data and accesses or generates the user's credentials (such as username and password) to provide them to the server/platform on which the data is stored. The client application also generates a "key" pair to be used for purposes of encrypting and decrypting data, in accordance with an embodiment of the invention (step or stage 404). The client application provides a client public key of the key pair to the server/platform along with the user credentials (step 406).

Note that in one embodiment, the credentials, data request, and client public key are provided to the server/platform as part of a unique communication session. Note further, that as described herein, the client public key may be obtained by the server or platform by other suitable means, including but not limited to (a) a data storage element accessible by the server and storing one or more previously generated or previously communicated keys, (b) generated by a suitable algorithm known to the client, (c) selected from a list of keys in accordance with an agreed upon heuristic or rule set, (d) reuse of a previously generated or provided key until the client sends a new one or a predetermined number of sessions or uses has occurred, etc.

The server/platform receives and processes the user's credentials and the client public key, and determines if the user is authorized to access at least some of the data stored on the server/platform (steps 408 and 410). If the user is authorized, then the server/platform processes the user's specific data request (step 412). As part of processing the data request, the server/platform may determine which fields, records, or portions of the requested data or document that the user is authorized to view or access. For example, the user may be authorized to access all of the requested data, only certain fields or records of the requested data, all but certain fields or records of the requested data, only data reflecting information between certain dates, etc. (step 414). If the user is authorized to access or view all or a portion of the requested data, then the server/platform generates a "key" pair and provides the platform public key to the client application (step 416). The server/platform then accesses the requested data (which may be a file, record, document, etc.) and prepares it for transmission to the user (step 418). This may involve decrypting previously encrypted data that was protected when stored in a database, etc. in accordance with a data security protocol that is part of the database or data storage element management system (step 420). Note that in some embodiments, a user's authorization to access specific data may be based on the user's name, the user's role within an organization, the user's location, the date, or other relevant characteristic.

Based on the user's authorization to see all or a portion of the requested data, the server/platform uses the client public key to encrypt all or a portion of the requested data (step 422). Thus, the server/platform may selectively encrypt a data field or fields, data record or records, or all or portions of a document in accordance with the user's authorization to access to the data. For example, the server/platform may use the client public key to encrypt that part of the requested data that the user is authorized to view or access, but use a different and confidential key to encrypt the remainder of the data. This permits the server/platform to prevent the user from accessing confidential data that they are not authorized to access (such as another person's social security number, health condition, medical test results, etc.), while allowing them to access other data in the requested set of data (as that data is encrypted with the client public key and the user/client has access to the corresponding key of the key pair). The server/platform provides the encrypted (and possibly associated unencrypted data) to the user/client over a suitable network (step 424). Note that the network itself may use a form of encryption to ensure data security for the communications session (such as SSL or a similar protocol), but that this security protocol is applied to an entire set of data or elements of a message and not selectively to those portions of data that the user is authorized to view (or not authorized to view, in which case a security method is used that the user does not have access to for purposes of decrypting the protected data).

The user/client receives the data, and may use the client private key to decrypt the data or the portions of the data that they are authorized to access (step 426). Note that if the user is entitled to view and access certain data fields, they may be authorized to edit or modify the data in those fields (step 428). In such a case, the user may perform the desired edits and then save the data. Afterwards the data in those fields may be encrypted using the platform public key prior to transmission to the server/platform over a suitable network (e.g., the Internet or a combination of wired/wireless networks) (step 430). Because the server/platform is in possession of the corresponding platform private key, the encrypted data may be decrypted and then undergo the normal security processes (such as re-encryption, etc.) to enable its storage in a database or other data storage element.

Embodiments of the invention described herein provide a system, apparatus, and method for enabling field level security (or a similar aspect of a record or document) to be applied to the transmission of data, and a technique for limiting the view-ability of these "protected fields" by an end user. As described herein, in embodiments of the invention the encryption and decryption of data may occur at several points of a data transfer process. These points include database access, communication session creation and transmission of data within the session, and protection of a subset of the transmitted data.

Note that in general, database encryption is a symmetric process where the encryption and decryption algorithms are the same and both are known by a database administrator. The administrator uses a password to encrypt the data before it is stored in the database. While the data resides in the database it remains in its encrypted state. If the entire system were to be shut down and the physical database moved and the system brought back up, then if the person bringing up the system knows the semi-permanent password the data could be decrypted. Note also that the decryption process is being performed on the system that is administering and providing access to the database. Viewed this way, the database encryption process is static. In contrast, in an embodiment of the invention, the encryption process and associated password are only valid during the data transfer and then only in the client device while a browser (or other suitable application) is open.

In session based encryption (such as using SSL), entire documents can be encrypted and/or authenticated (i.e., "signed"), and the recipient of the document can decrypt the document if they know the password and they can verify that the document has not been altered by verifying the signature. Similar to the database encryption scenario, in this case the password is known ahead of time and the signature verification process is based on a previously set password or key. This entire document encryption process is how the verification of the certificate is done for the beginning of SSL. In general, SSL uses asymmetric encryption to verify the certificate in the initial handshake, but then uses symmetric session keys for data protection and transfer after the handshake.

In contrast, in embodiments of the invention, the inventive process creates new keys (public and private) each session, with those keys being valid only for the session. In this sense they are different from the semi-permanent passwords used when storing data in databases or for encrypting entire documents. While once a SSL session is established, the passwords/keys used are only valid for that session, they are used to encrypt the entire packet of information. The receiver in turn decrypts all of the communicated information. In an embodiment of the invention, selected fields may be encrypted, with the receiver displaying only the non-encrypted fields, or instead choosing to display the confidential fields by doing the client side decryption of those fields. In one embodiment, the invention uses asymmetric public/private keys to encrypt protected fields. In addition to other benefits, this also adds protection against "man in the middle attacks", where data is intercepted and decrypted.

As described, in an embodiment of the invention, when a user logs in, the client and the server each create a new public key and private key for purposes of asymmetric cryptography and share their public keys with each other (i.e., if the user has permission to access the protected fields of a record, file, document, etc.). The protected data would be stored in a data center using standard database (e.g., Oracle) encryption. When a protected field or other form of data is requested by the client, the server decrypts the field from the database and then re-encrypts the field using the client public key. The re-encrypted field is sent to the client, where it may be viewed by decrypting using the client private key. For example, if the user wants to edit the protected field, they may click a button which uses the client private key to decrypt the data. After the data is edited and prior to sending the data to the server, the client re-encrypts the data using the server public key. When the server receives the data, it decrypts it using the server private key and re-encrypts it with the database encryption before writing to the database or other data storage element.

FIGS. 5(a) through 5(h) are diagrams illustrating aspects of the data transfer processes that may occur and screen displays that may be generated when using an embodiment of the invention. As an example of using an embodiment of the invention, consider a typical communication session that is implemented in accordance with the HTTPS and SSL protocols (as discussed, HTTPS and SSL (Secure Socket Layer) are a commonly used method of transferring internet traffic securely). In a typical situation, the protocols operate as follows:

(a) The client sends a "hello" packet to the SSL server;
(b) The Server responds with a copy of Its Certificate;
(c) The Client authenticates the certificate, thereby verifying that it came from the Server—the Certificate also contains the Server public key;
(d) Using the Server's public key, the Client encrypts a pre-master secret key and sends it to the Server;
(e) The Server (and Client) then create(s) a master secret key which is used for all communication from that point forward.

Figure 5:
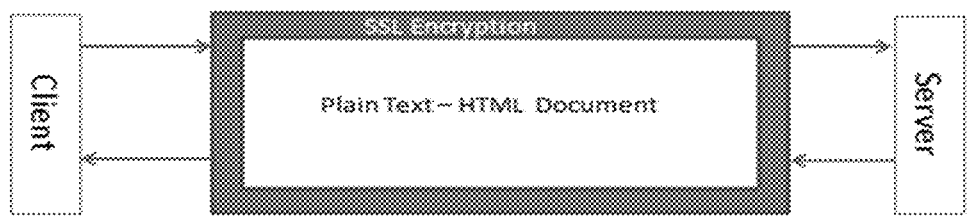
FIGS. 5(a) through 5(h) are diagrams illustrating aspects of the data transfer processes that may occur and screen displays that may be generated when using an embodiment of the invention.
Figure 5:
Figure 5:
Figure 5:
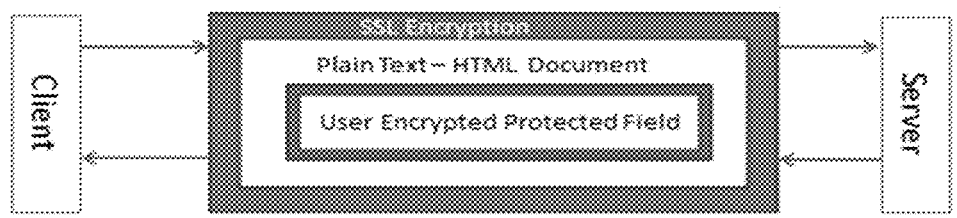
Figure 5:
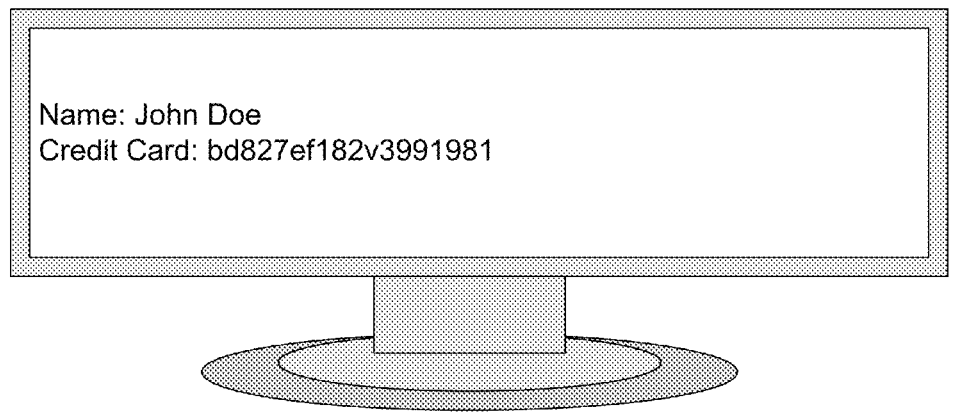
Figure 5:
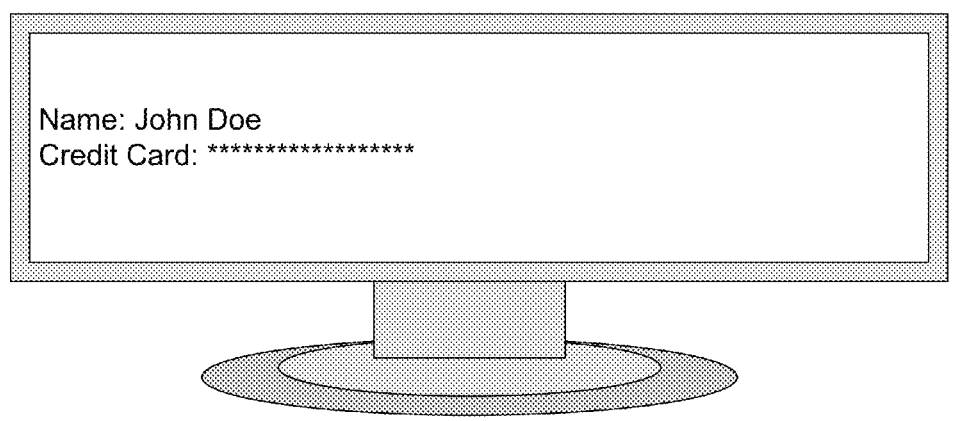
Figure 5:
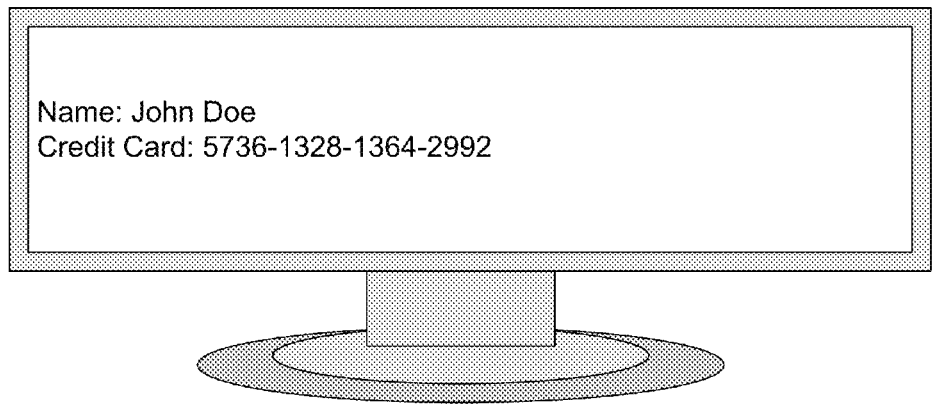
Figure 5:
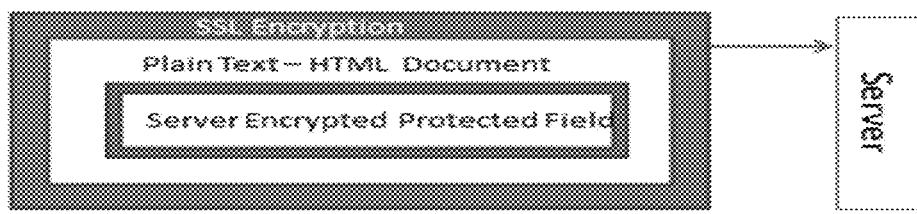

After this "handshake" operation, further communications appear as shown in FIG. 5(a). Note that the entire document being transmitted is encrypted with a single password/encryption method; once the SSL layer is "unwrapped", the entire document is visible. The user is unaware of the encryption process and has no control over it:

(f) When using an embodiment of the invention, once the SSL connection is established, the user on the client device is presented with a login page that requests a user ID and password in order to login to the server system; the client then creates a client public key/ private key pair and sends the client public key along with the login information to the Server, as shown in FIG. 5(b):
(g) If the login process is successful (i.e., the user is authenticated), then the Server responds with a welcome screen (as shown in FIG. 5(c) and the Server creates a Server public/private key pair and sends the Server public key to the client;
(h) Now that the respective public keys have been shared, the Server can send documents to the client where one or more protected fields are encrypted using the client's public key, as shown in FIG. 5(d);

When the document is displayed to the user in the browser application, the client device uses its private key to decrypt the encrypted data and present it to the user, as shown in FIG. 5(e);

Optionally, in one embodiment, the protected data can instead be redacted and not presented to the user pending an additional action by the user (such as re-entry of a password, activation of an appropriate "button" or other user interface element, etc.). Note that if the user is not authorized to view some or all of the protected data, then that protected data may remain redacted or otherwise not visible to the user, as shown in FIG. 5(f);

(i) In one embodiment, if the user on the client device wishes to see or edit the protected data, they may activate a "show" button or other user interface element (not shown in the picture) and be able to view and edit the protected data. Optionally, the user may be required to re-enter their password prior to being allowed to view or edit protected data. Once the password is re-entered and verified, the redacted fields are exposed and available for editing, as shown in FIG. 5(g);
(j) When the user completes viewing or editing the protected field(s) (and/or performs a required step, such as activating a "Hide" button), the fields are redacted again. When the user is done editing and the data is to be sent to the Server, the data is re-encrypted with the public key of the Server before transmission, as shown in FIG. 5(h); and
(k) When the encrypted data is received by the Server, it is decrypted using the Server private key. The Server may then perform the operations needed to prepare the data for storage in a memory or database (such as re-encrypting the data using the data protection functions of the database).

Note the following aspects of some embodiments of the invention:

(a) Protected data has an additional encryption (over SSL) going to and from the Server;
(b) Protected data is not displayed to the user until the user makes an overt action to display the data;
(c) An optional password may be required to display or edit the protected data;
(d) The protected data can be hidden as soon as editing is completed in the protected field; and
(e) Protected data is decrypted and re-encrypted entirely in the client device, with the client decryption and re-encryption processes capable of using different keys and/or different algorithms if desired.

In some embodiments, benefits of using the invention are derived by one or more of where in the communication flow/process the encryption is added, that certain fields can be protected or not, and that the entire record can be sent to a user who may or may not have authorization to access the protected fields. Aside from cases of multilevel database encryption, there is typically one password for an entire database; thus, anyone who has the password can read the data. In contrast, in some embodiments of the invention any number of people can have public/private keys, or public/ private keys could be shared by users with shared authorization levels. Another option is for the keys to be dynamically generated at the time a session is established, e.g., when a user logs in. In terms of implementation scenarios and benefits of those scenarios, the following are noted:

a. The invention may be added to an existing client-server cloud system without modifying the existing platform software;
b. Entire records (all fields) may be transferred between client-server and server-client;
c. Protected fields are not visible to users unless they are authorized to access them; and
d. Authorization may be permitted by individuals or groups, and with different levels of access.

Note that the client public/private key used in an embodiment of the invention need not be generated in real time, but may instead be semi-permanent or previously determined and made available to the server. In this case, the platform may store and use the same client public key from session to session or for a predetermined number of sessions before selecting a new key. The user on the client may need to enter the private key in the beginning of the session or for each transaction within the session to authenticate themselves. In some embodiments, the client private key may be manually provided, or instead stored in a memory device such as a USB stick that is provided to a client device. The client software would then use this private key to decrypt the protected fields. In one embodiment, the client public key may be provided to the server from a previously populated data storage element that is in communication with the server/platform. In such an embodiment, the client public key may be selected from a previously generated list, may be generated using a predetermined algorithm, may be accessed from a set of keys that were previously provided to the data storage element, etc. Thus, in some embodiments, the client key used by the server may not be provided by the client during that session, but may instead be obtained from a data storage element or other suitable source.

As noted, the inventive technology may be superimposed on top of an existing system architecture without changing the native platform application. This provides advantages in that the data only needs to be transferred from the platform to the client once. In other implementations not using the inventive method, data would need to be transferred twice from the platform to the client when the user wanted to access protected fields, and those fields would not have additional encryption protection. In one embodiment, the client software could be designed to timeout user access to the protected fields; in this case a user might only have 60 seconds to view or modify the protected fields without reentering the client private key.

In accordance with at least one embodiment of the invention, the system, apparatus, methods, processes and/or operations for providing field level protection of data stored on a cloud-computing platform may be wholly or partially implemented in the form of a set of instructions executed by one or more programmed computer processors such as a central processing unit (CPU) or microprocessor. Such processors may be incorporated in an apparatus, server, network element, client or other computing device operated by, or in communication with, other components of the system. As an example, FIG. 1 is a diagram illustrating elements or components that may be present in a computer device and/or system 100 configured to implement a method and/or process in accordance with an embodiment of the invention. The subsystems shown in FIG. 1 are interconnected via a system bus 102. Additional subsystems include a printer 104, a keyboard 106, a fixed disk 108, and a monitor 110, which is coupled to a display adapter 112. Peripherals and input/output (I/O) devices, which couple to an I/O controller 114, can be connected to the computer system by any number of means known in the art, such as a serial port 116. For example, the serial port 116 or an external interface 118 can be utilized to connect the computer device 100 to further devices and/or systems not shown in FIG. 1 including a wide area network such as the Internet, a mouse input device, and/or a scanner. The interconnection via the system bus 102 allows one or more processors 120 to communicate with each subsystem and to control the execution of instructions that may be stored in a system memory 122 and/or the fixed disk 108, as well as the exchange of information between subsystems. The system memory 122 and/or the fixed disk 108 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method for improving the performance of a computing platform, the method comprising:
receiving a first electronic communication from a remote computing device requesting access to a data record having a plurality of elements stored in a data storage element of the platform, the first electronic communication including authentication data corresponding to a user of the remote computing device, wherein the authentication data comprises a key for the remote computing device, the key being: (i) specific to a communication session related to the first electronic communication, and (ii) different from a subsequent key for the remote computing device included in the authentication data corresponding to the user as part of a different communication session;

analyzing the key to determine that the user is authorized to access some but not all of the plurality of elements of the data record requested as part of the first electronic communication;

generating a second electronic communication to the remote computing device that includes an encrypted version of the requested data record, wherein the encrypted version includes: (i) a first portion of the plurality of elements included in the data record requested by the remote computing device that is encrypted using the key for the remote computing device to enable the remote computing device to decrypt the first portion of the plurality of the elements, and (ii) a second portion of the plurality of elements included in the data record requested by the remote computing device that is encrypted differently than the first portion to prevent the remote computing device from decrypting the second portion of the plurality of elements.

2. The method of claim 1, further comprising:
accessing the data record from the data storage element; and
decrypting the first portion of the plurality of elements of the data record prior to generating the second electronic communication.

3. The method of claim 1, wherein analyzing the authentication data further comprises:
verifying the authentication data against a database of users' authentication data; and
identifying the first portion of the plurality of elements in the requested data record that the user is authorized to access.

4. The method of claim 1, wherein analyzing the authentication data further comprises:
determining a user's role in an organization based on the authentication data; and
determining the first portion of the plurality of elements in the requested data record that the user is authorized to access based on the user's role.

5. The method of claim 1,
wherein the key received as part of the authentication data is a first public key that is part of a first public/private key pair; and
the second portion of the plurality of elements in the data requested data record is encrypted using a second public key of a second public/private key pair.

6. The method of claim 1, wherein the first portion of the plurality of elements comprises data contained in a data field of the data record.

7. A multi-tenant computing service platform, comprising:
an electronic processor programmed to execute a set of instructions;
a data storage element in which the set of instructions are stored and in which data records are stored, wherein when executed by the processor the set of instructions cause the platform to be configured to receive a first electronic communication from a remote computing device requesting access to a data record having a plurality of elements stored in the data storage element, the first electronic communication including authentication data corresponding to a user of the remote computing device, wherein the authentication data comprises a key for the remote computing device, the key being: (i) specific to a communication session related to the first electronic communication, and (ii) different from a subsequent key for the remote computing device included in the authentication data corresponding to the user as part of a different communication session;

analyze the key to determine that the user is authorized to access some but not all of the plurality of elements of the data record requested as part of the first electronic communication;

generate a second electronic communication to the remote computing device that includes an encrypted version of the requested data record wherein the encrypted version includes: (i) a first portion of the plurality of elements included in the data record requested by the remote computing device that is encrypted using the key for the remote computing device to enable the remote computing device to decrypt the first portion of the plurality of the elements, and (ii) a second portion of the plurality of elements included in the data record requested by the remote computing device that is encrypted differently than the first portion to prevent the remote computing device from decrypting the second portion of the plurality of elements.

8. The multi-tenant computing service platform of claim 7, wherein the multi-tenant computing service platform is further configured to:
access the data record from the data storage element; and
decrypt the first portion of the plurality of elements of the data record prior to generating the second electronic communication.

9. The multi-tenant computing service platform of claim 7, wherein the data storage element comprises a database.

10. The multi-tenant computing service platform of claim 7, further configured to:
receive the key as part of the authentication data as a first public key that is part of a first public/private key pair for the remote computing device; and
encrypt the second portion of the plurality of elements in the data requested data record using a second public key of a second public/private key pair.

11. The multi-tenant computing service platform of claim 7, wherein the first portion of the plurality of elements comprises data contained in a data field of the data record.

12. A method comprising:
sending a first electronic communication from a client computing device to a remote multi-tenant computing platform requesting access to a data record having a plurality of elements stored in a data storage of a multi-tenant computing platform, the first electronic communication including authentication data corresponding to a user of the client computing device, wherein the authentication data comprises a key for the client computing device, the key being: (i) specific to a communication session related to the first electronic communication, and (ii) different from a subsequent key for the client computing device included in the authentication data corresponding to the user as part of a different communication session;

receiving at the client computing device a second electronic communication from the multi-tenant computing platform that includes an encrypted version of the requested data record, wherein the encrypted version includes: (i) a first portion of the plurality of elements that is encrypted using the key for the client computing device to enable the client computing device to decrypt the first portion of the plurality of elements, and (ii) a second portion of the plurality of elements that is encrypted differently than the first portion the client computing device from decrypting the second portion of the plurality of elements; and decrypting the first portion of the plurality of elements.

13. The method of claim 12, wherein:

the key is a public key of a public/private encryption key pair that is sent to the multi-tenant computing platform; and the first portion of the plurality of elements is decrypted using a private key of the public/private encryption key pair.

14. The method of claim 12, wherein the authentication data further comprises a username and password corresponding to a user of the client computing device.

15. The method of claim 12, wherein the authentication data further comprises a user's role in an organization.

16. The method of claim 12, wherein the second portion of the plurality of elements in the received encrypted data record are encrypted with a public/private key pair that is inaccessible to the client computing device.

17. The method of claim 12, wherein the first portion of the plurality of elements comprises data contained in a data field of the data record.

18. A client computing device, comprising:

a processor programmed to execute a set of instructions;

a data storage element in which the set of instructions are stored, wherein when executed by the processor the set of instructions cause the client computing device to be configured to send a first electronic communication from the client computing device to a remote multi-tenant computing platform requesting access to a data record having a plurality of elements stored in a data storage at the multi-tenant computing platform, the first electronic communication including authentication data corresponding to a user of the client computing device, wherein the authentication data comprises a key for the client computing device, the key being: (i) specific to a communication session related to the first electronic communication, and (ii) different from a subsequent key for the client computing device included in the authentication data corresponding to the user as part of a different communication session;

receive a second electronic communication from the multi-tenant computing platform that includes an encrypted version of the requested data record wherein the encrypted version includes: (i) a first portion of the plurality of elements that is encrypted using the key for the client computing device to enable the client computing device to decrypt the first portion of the plurality of elements and, (ii) a second portion of the plurality of elements that is encrypted differently than the first portion to prevent the client computing device from decrypting the second portion of the plurality of elements; and decrypt the first portion of the plurality of elements.

19. The client computing device of claim 18, further configured to store the received encrypted record in the data storage element.

20. The client computing device of claim 18, wherein the data storage element comprises a database.

21. The client computing device of claim 18, further configured to:

send the key as a first public key that is part of a first public/private key pair with the authentication data in the request; and decrypt the first portion of the plurality of elements that is determined to be accessible by the user using a first private key that is part of the first public/private key pair.

22. The client computing device of claim 18, wherein the first portion of the plurality of elements comprises data contained in a data field of the data record.

23. The client computing device of claim 18, wherein the authentication data comprises a username and password corresponding to the user of the client computing device.

24. The client computing device of claim 18, wherein the authentication data comprises an organizational role corresponding to the user of the client computing device.

25. The client computing device of claim 18, wherein the authentication data comprises a physical location corresponding to the client computing device.

* * * * *